Figure 1:
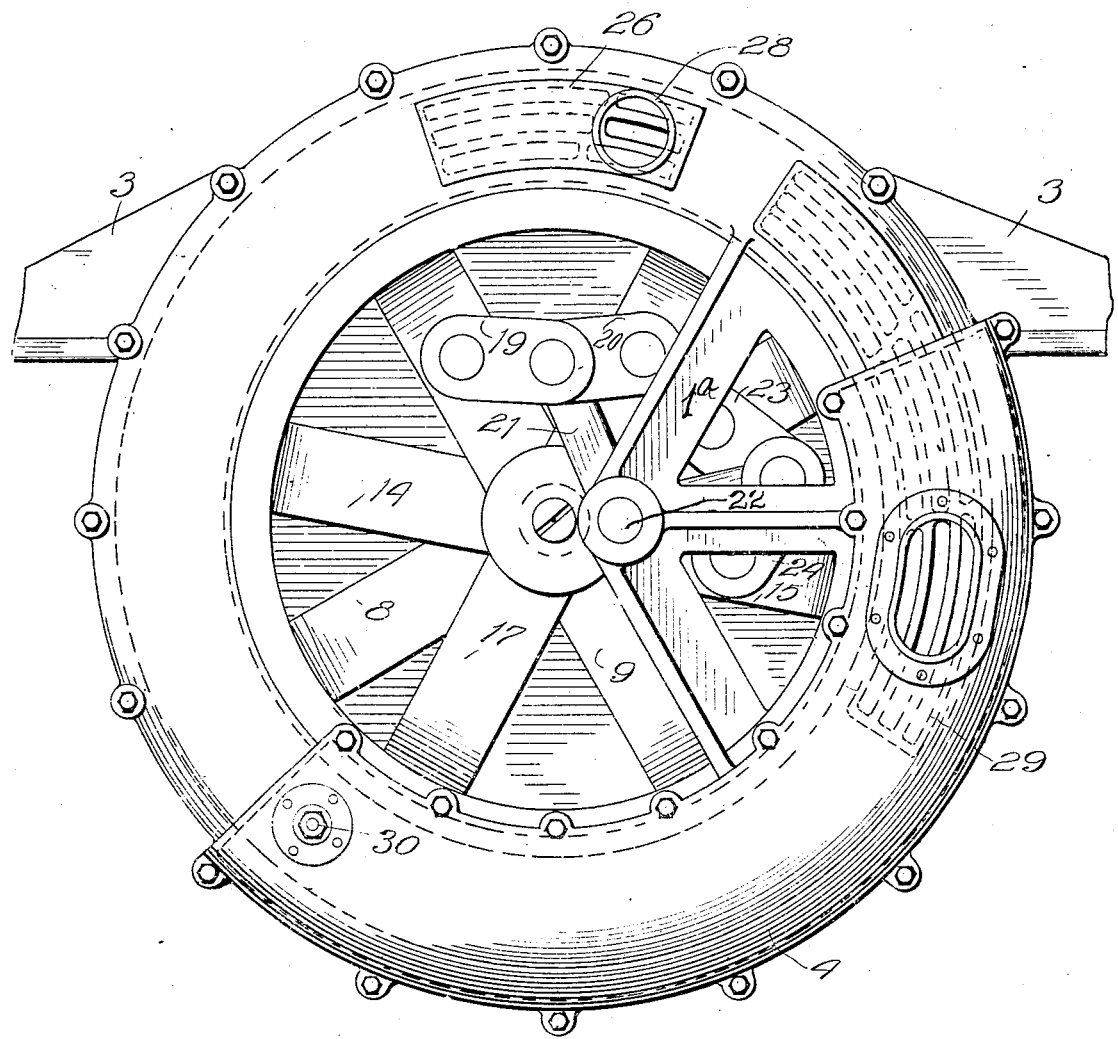

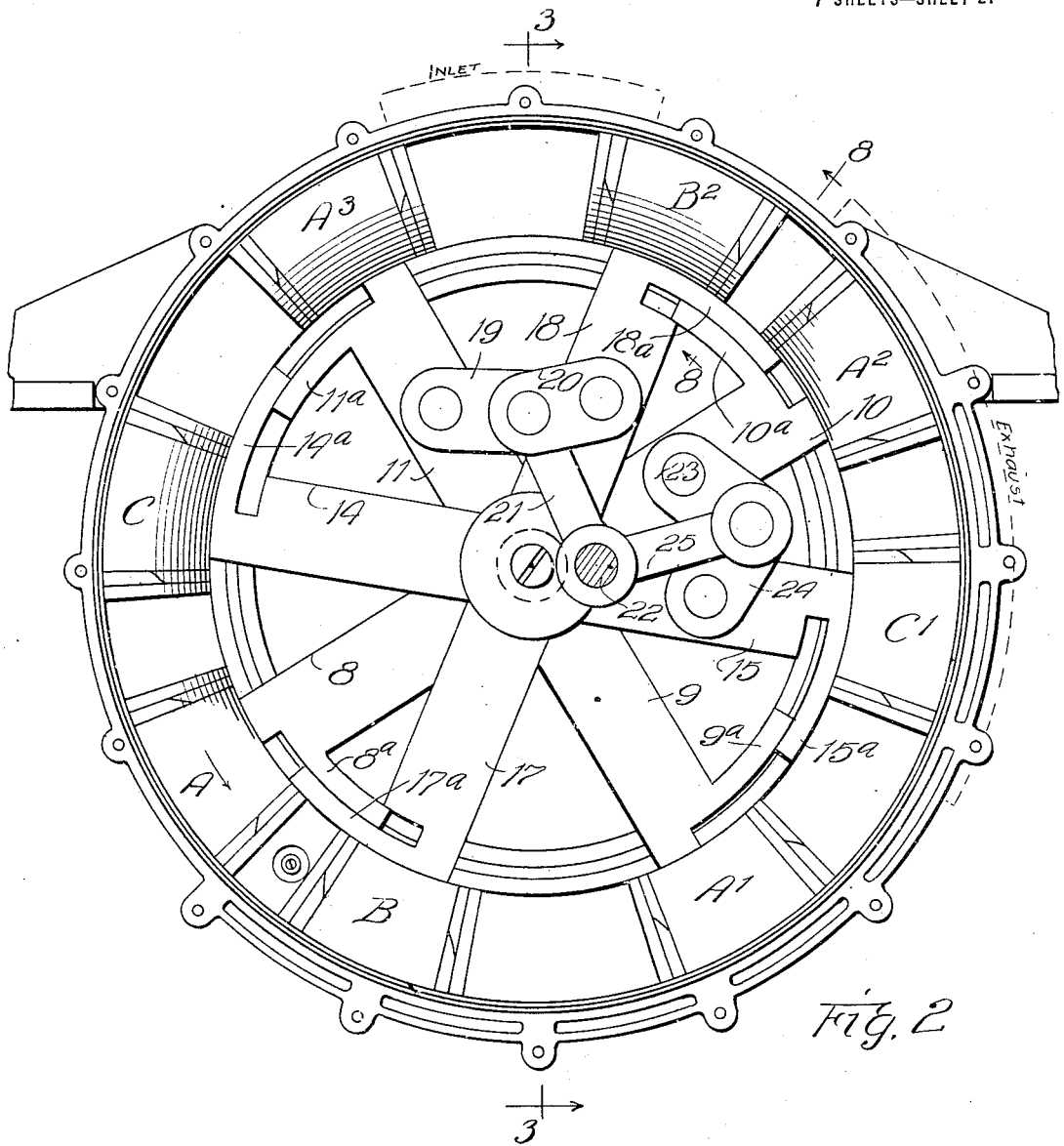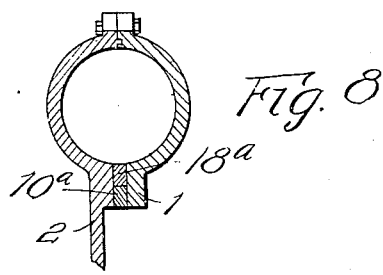

C. O. FARNHAM.
INTERNAL COMBUSTION ROTARY ENGINE.
APPLICATION FILED NOV. 23, 1918.

1,308,896.

Patented July 8, 1919.
7 SHEETS—SHEET 3.

Inventor
Carl O. Farnham,
by Rector, Hibben, Davis Macauley
His Attys

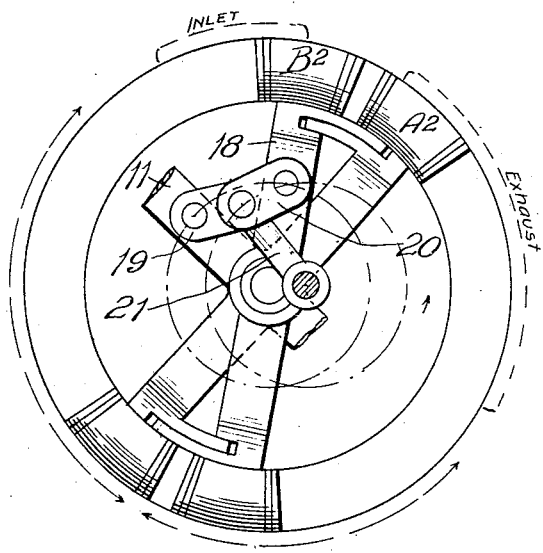
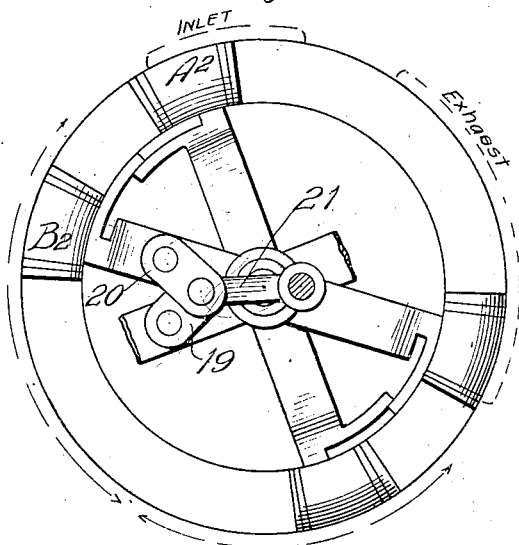
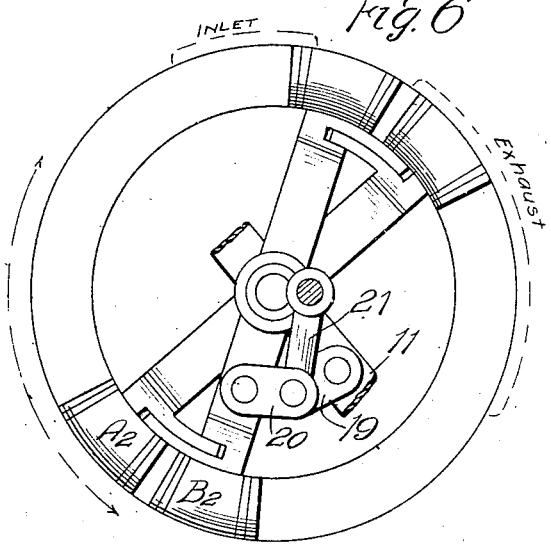
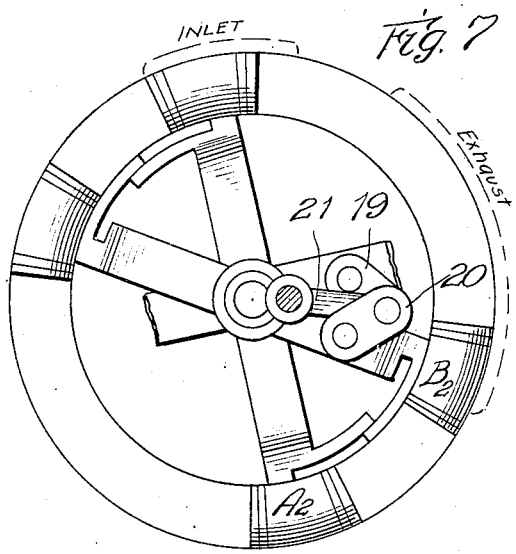

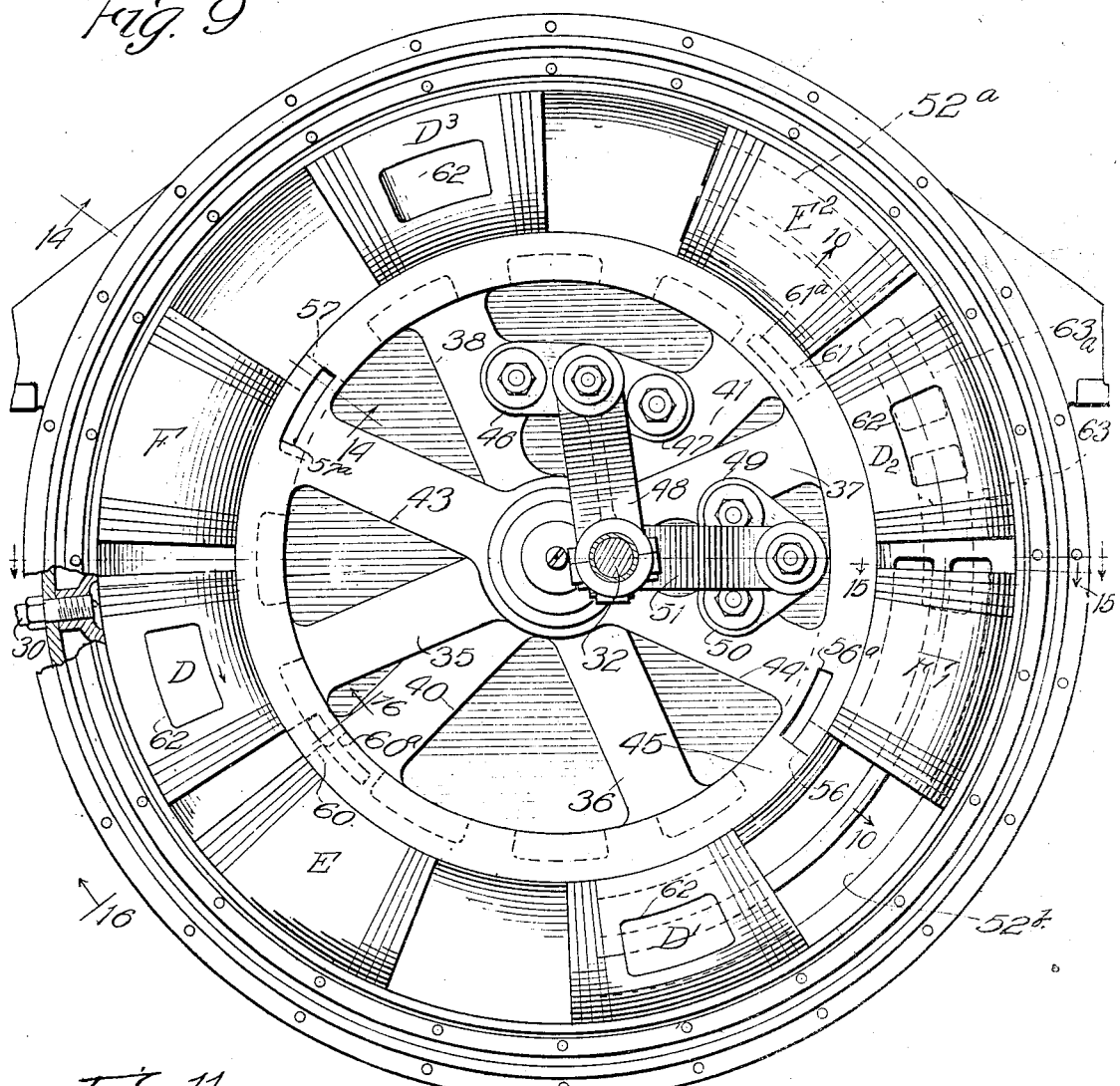
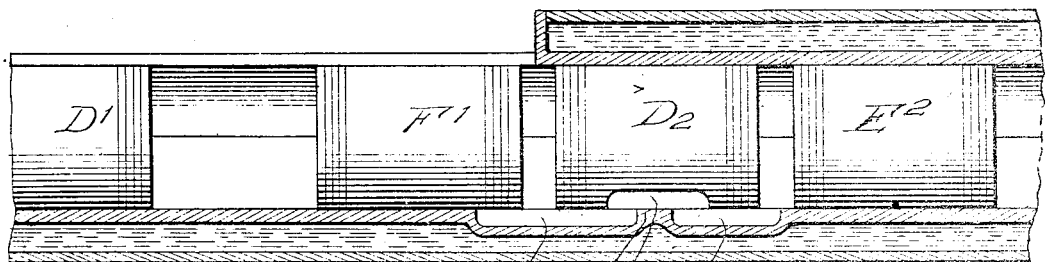

C. O. FARNHAM.
INTERNAL COMBUSTION ROTARY ENGINE.
APPLICATION FILED NOV. 23, 1918.

1,308,896.

Patented July 8, 1919.
7 SHEETS—SHEET 6.

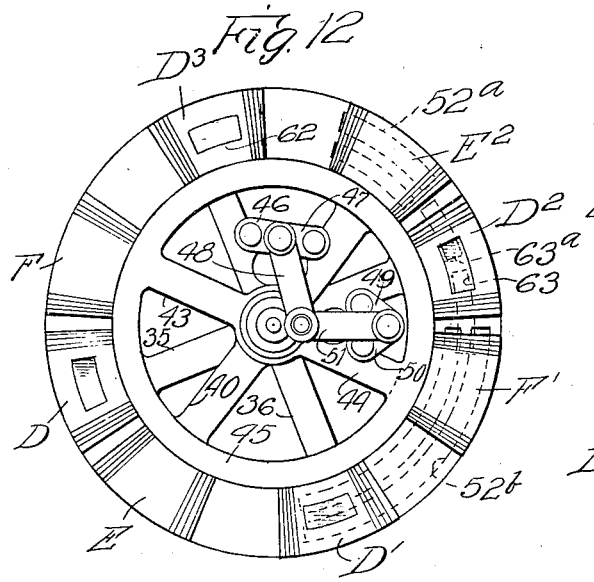
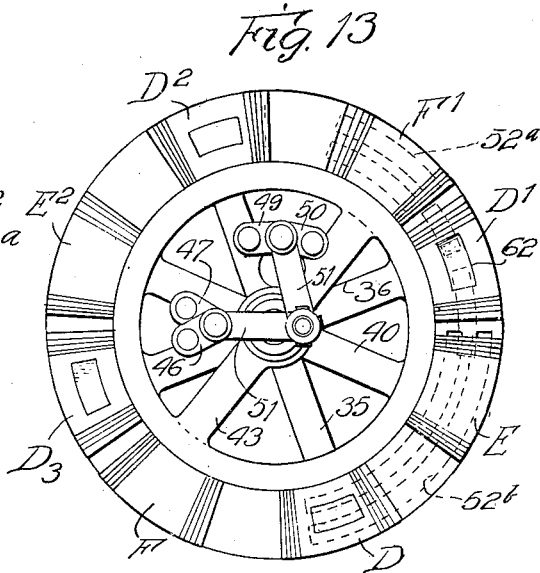
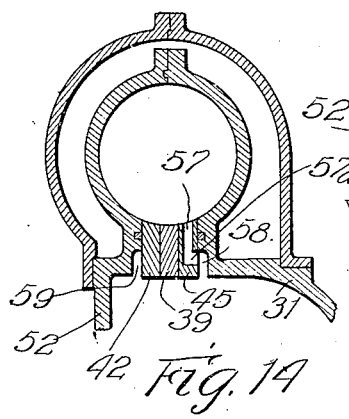
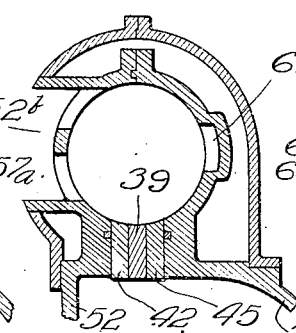
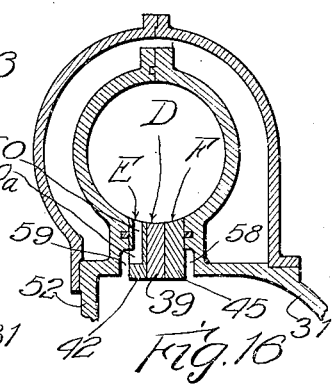

UNITED STATES PATENT OFFICE.

CARL O. FARNHAM, OF PARIS, ILLINOIS.

INTERNAL-COMBUSTION ROTARY ENGINE.

1,308,896.　　　　Specification of Letters Patent.　　Patented July 8, 1919.

Application filed November 23, 1918.　Serial No. 263,800.

*To all whom it may concern:*

Be it known that I, CARL O. FARNHAM, a citizen of the United States, residing at Paris, in the county of Edgar and State of Illinois, have invented certain new and useful Improvements in Internal-Combustion Rotary Engines, of which the following is a specification.

My invention relates to an internal combustion rotary engine in which a series of pistons are arranged to travel continuously in a circular path through an annular piston chamber, the explosive mixture being taken in between two pistons at one point in their travel, compressed by relative movement of such pistons at a later point and the compressed charge then ignited, the expansion of the burning gases acting on the pistons to separate them and this relative movement being caused to impart a rotative movement to the power shaft, and the burning gases then exhausted by a relative movement of the pistons toward each other, after which the two pistons separate to take in a fresh charge of explosive mixture and the operations are repeated so long as the engine is in operation. This cycle of operations corresponds substantially to the four-stroke cycle or Otto cycle of widely used reciprocating gasolene engines. The object of my invention is to provide a motor of this type which through my novel and simple mechanism for transmitting the stress upon the pistons developed by the combustion of the gases to the power shaft shall be efficient and desirable for the purposes in view. Further objects, ancillary and incidental to the main purpose of my invention, relate to a novel method of scavenging the exhaust chamber of burnt gases by air, and the arrangement and construction of the different parts of the engine to accomplish the functions for which they are designed. The essential elements of my invention are more particularly pointed out in the appended claims, it being understood, however, that variations in the form and proportions of the parts of the particular structures hereinafter described may be made without departing from the substance of my invention or the scope of the claims.

In Figures 1 to 8 of the drawings forming part of this application I have illustrated an engine exemplifying one form of my invention, and in Figs. 9 to 16 I have illustrated a different and preferred form having a modified arrangement of coöperating members and including means for scavenging the explosion chambers of burned gases by a charge of air at the end of each exhaust movement of a pair of coöperating pistons.

Figure 3:
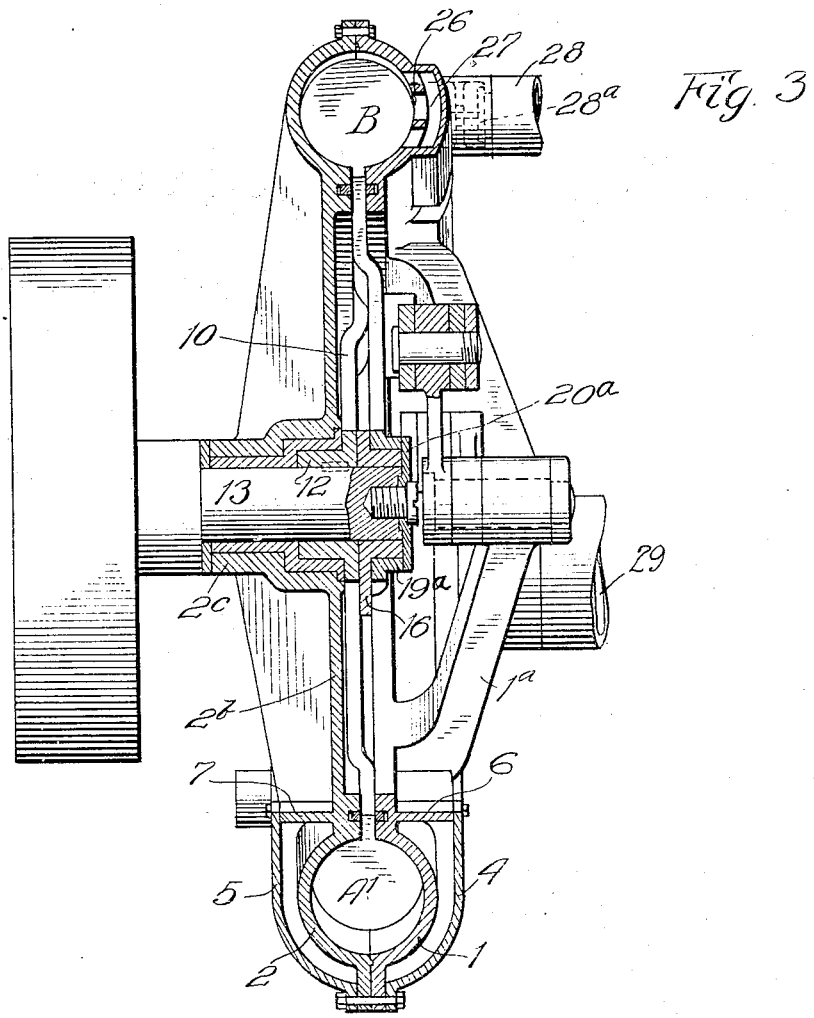
Figure 10:
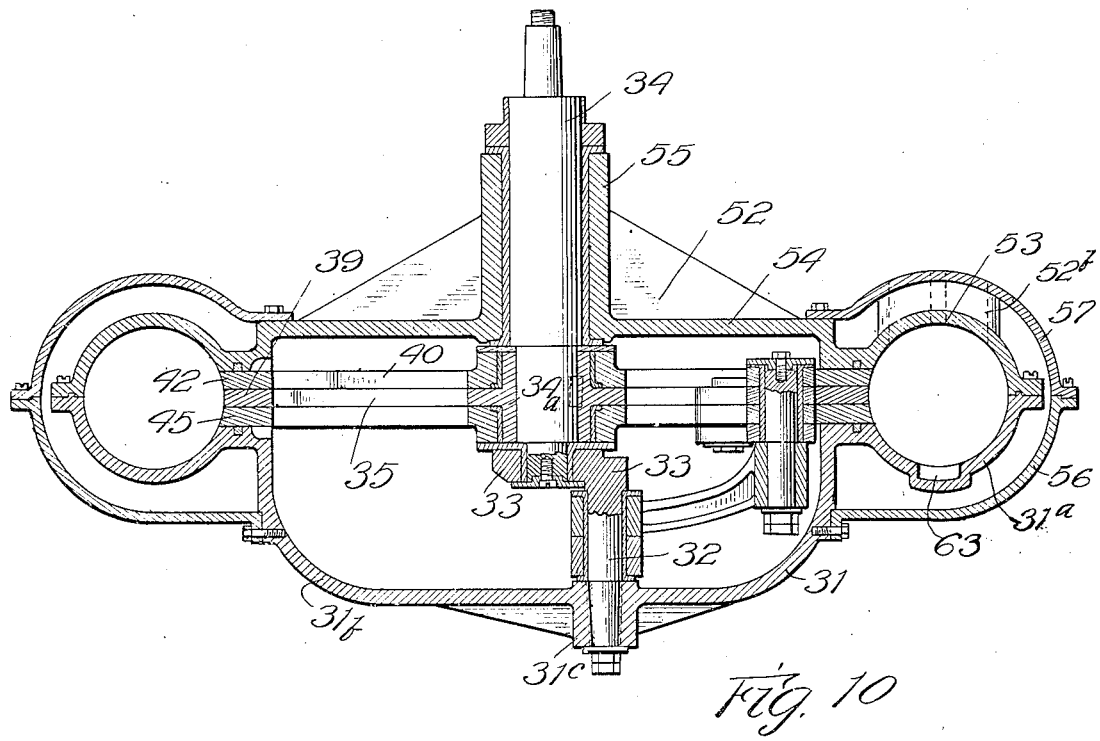

Of the drawings Fig. 1 is a front elevation of the first-mentioned form of my invention; Fig. 2 is a similar view, but with the front casing plate removed showing the pistons exposed to view; Fig. 3 is a vertical diametrical section, looking in the direction of the arrows 3—3 of Fig. 2; Figs. 4, 5, 6 and 7 are fragmentary views illustrating successive positions of a pair of coöperating pistons in their travel through the annular piston chamber; Fig. 8 is a transverse section on the line 8—8 of Fig. 2; Fig. 9 is a front view of the preferred and modified form of my invention with the front casing plate removed; Fig. 10 is a diametrical horizontal section of the same, looking downward; Fig. 11 is a linear extension of the pistons shown at the right-hand side of Fig. 9, on the line 10—10 of Fig. 9 and viewed in the direction of the arrows; Figs. 12 and 13 are views illustrating successive positions of the toggles and pistons; and Figs. 14, 15 and 16 are sections on the lines 14—14, 15—15, and 16—16 of Fig. 9, showing the arrangement of certain ports and passages.

The same reference characters indicate the same parts in all the figures of the drawing.

Describing first the embodiment of my invention illustrated in Figs. 1 to 8, inclusive, the annular piston chamber in which the pistons travel may conveniently be formed in two casing plates, a front plate 1 and a rear plate 2, which are secured together by bolts passing through flanges extending around their periphery and are supported in any suitable manner, as by the integral supporting arms 3. As shown, the rear casing plate consists of a rim portion which is semicircular in cross-section, a flat central portion $2^b$ formed with a hub bearing $2^c$ to receive the power shaft, and radial strengthening flanges. The front casing plate consists of a similar rim portion and is formed with an inwardly extending bracket $1^a$ in the inner end of which is mounted an eccentric pin 22, the purpose of which will be later explained. I provide a water jacket along that portion of the piston chamber in which the burning of the gases takes place and the heated gases exhaust, by means of arcuate plates 4 and 5 which are secured respectively to the flanges of the casing members 1 and 2 and to arcuate walls 6 and 7 extending outwardly from the inner side of such casing members.

Arranged within the annular piston chamber are a plurality of pistons, in the present instance eight in number, four of which, marked A, A¹, A² and A³ are carried respectively by arms 14 and 15 secured to a hub 16 which is rotatably mounted on the motor shaft; and the other two pistons, marked B and B² are respectively carried by arms 17 and 18 fixed to a hub 19ª which is also rotatably mounted coaxially of the motor shaft, the hub 16 being shouldered to provide a bearing for the hub 19ª so that the two hubs are rotatably nested together as illustrated. A cap 20ª secured to the motor shaft is provided to prevent disengagement of the parts.

As shown (see Figs. 3 and 8), the casing plates 1 and 2 do not meet around the inner side of the annular piston chamber but are formed with opposing flat faces between which the arms carrying the pistons rotate. The arms are formed to make a sliding gas-tight engagement with these faces, and are provided with over-lapping arcuate extensions so arranged as to seal every alternate space between the pistons. In the present instance, as illustrated, the extension 11ª of the arm 11 coöperates with the extension 14ª of the arm 14 to seal the space between the pistons A³ and C, and like extensions 8ª and 17ª, 9ª and 15ª, and 10ª and 18ª, seal the spaces between the pairs of pistons A and B, A¹ and C¹, and A² and B², respectively. The intervening spaces are open to atmosphere and permit the air to breathe in and out idly. The arm 11 of the frame carrying the pistons A, A¹, A², and A³, is connected by a toggle 19—20 with the arms 18 carrying (together with arm 17) the pistons B² and B, and the knee of the toggle is pivotally connected by a link 21 with the eccentric pin 22 mounted in the bracket 1ª heretofore mentioned. A similar toggle 23—24 connects the arms 10 and 15, and a pivoted link 25, similar to the link 21, connects the knee of this toggle with the eccentric pin 22. Since the arms 8, 9, 10 and 11 are parts of one rigid frame connected to the motor shaft, and the arms 17 and 18 are rigidly connected and rotatable with respect to such shaft, it is obvious that as the motor shaft revolves the piston B² will, through the action of the toggle 19—20, and the link 21, successively shift from a position of proximity to the piston A²—with which it co-operates—when the toggle members are in line (nearly the position shown in Fig. 4) to a position where they are remote, the eccentric pin and toggle joint being then in line with the axis of the motor shaft, as shown in Fig. 5, and will again approach a position of proximity when the toggle joint passes its dead center, and then separate to remote position as the toggle joint and eccentric pin and motor shaft come into line on the other side of the motor shaft, as shown in Fig. 7. It is further obvious that the coöperating pistons B and A will describe exactly similar movements, and that by the action of the toggle 23—24 and link 25 the two pairs of coöperating pistons A² C¹ and A C will pass through the same cycle of movements. It will therefore suffice to explain the action of the pair of pistons A² B², shown in their successive positions in Figs. 4 to 7.

The inlet port 26, it should be first explained, consists of a series of arcuate openings communicating with a box 27 formed on the side of the casing plate 1, which box communicates through an inlet pipe 28 with means for supplying a suitable combustible vapor, such as a carbureter of any suitable or known construction, not necessary to illustrate. Preferably a check valve 28ª of large capacity and light tension is arranged in the fuel passage adjacent the inlet port. The exhaust port 29 consists of similar arcuate openings communicating with an exhaust passage formed in the casing plate and having an opening to the atmosphere through walls which are continuous with the water jacket. A spark plug 30, located in a pocket in the wall of the piston chamber, is arranged to ignite the charges of explosion gas at the point of greatest compression.

In Figs. 4 to 7 the arcs embraced by the inlet and exhaust ports are indicated diagrammatically by dotted lines marked "Inlet" and "Exhaust". In Fig. 4 the piston A² has just closed the exhaust port and the pistons A², B² are traveling in a counter-clockwise direction toward the inlet port, and the toggles 19—20 having just passed its straight or extended position the eccentric connection is drawing the arms 11 and 18 together, which has the effect of separating the pistons,—in other words of causing the piston B² to speed up and draw away from the piston A²,—until the parts assume the position shown in Fig. 5. During the early part of this movement of the pistons the working chamber between the pistons is exhausted, and the inlet port is then uncovered by the piston B², when the vacuum is relieved by a sudden inflow of explosive vapor. The taking in of fuel then continues until the pistons become separated to their greatest extent, at which point the inlet port is closed by the piston A². As the toggle-joint now straightens out the piston B² lags with respect to the piston A², compressing the gas, which latter is exploded as the toggle-joint crosses its center. The stress of the explosion tends to separate the pistons and, in effect, the toggle members 19 and 20 are pressed together with equal force, resulting in a thrust on the knee of the toggle in a direction radial of the motor shaft. Since the link 21 which sustains the pull of this thrust is connected eccentrically to the pin 21, the knee of the toggle is forced outwardly and to the right (as Fig. 6 is viewed,) bending the toggle joint and separating the pistons and carrying both pistons around in a counter-clockwise direction to the position shown in Fig. 7. The exhaust port is now uncovered by the piston B², and the exhausting of burned gases continues while the toggle straightens and the pistons approach each other and until such port is closed by the piston A² just before the pistons reach the position shown in Fig. 4, completing the cycle of operations.

It is obvious that the pistons on opposite sides of each of the four pistons A, A¹, A² and A³ will approach any given one of those pistons twice at diametrically opposite positions in the course of a single revolution of the motor shaft, and spread apart twice at opposite points approximately 90° distant from the first mentioned positions. These four pistons A, A¹, A² and A³, being connected together and to the motor shaft (and the fly wheel, if one is used) rotate at a substantially uniform speed, while the other four pistons B, B², C and C¹ have a variable speed and accelerate and lag to describe the movements above explained.

In the particular embodiment of my invention above described the spaces in advance of the four constant-speed pistons, A, A¹, A² and A³ are sealed and function as working chambers, and the spaces to the rear are open to atmosphere and idle. The spaces to the rear of these constant-speed pistons may be employed as working chambers, however, and in the preferred form of my invention illustrated in Figs. 9 to 16, I have shown such an arrangement.

The front plate 31 of the preferred form of my invention now to be described consists of a peripheral portion 31ᵃ, approximately though not completely, semi-circular in cross-section and a central bowl-shaped portion 31ᵇ on which is formed a boss 31ᶜ within which is secured an eccentric pin 32, the inner end of this pin being integral with a block 33 bored to form a journal bearing for the end of the motor shaft 34,—see Fig. 10. The rear casing plate 52 is formed with a peripheral portion 53 forming the rear portion of the piston chamber and a central back wall 54 integral with the hub 55, which latter provides a bearing for the motor shaft.

As shown the water jacket extends entirely around the outside of the piston chamber, and is formed by front and rear plates 56 and 57 bolted into the casing plates 31 and 52.

Rigidly secured to the motor shaft is the hub 34ᵃ of a four-armed frame consisting of the arms 35, 36, 37 and 38, which arms are integral with a flat ring 39 to which are secured the constant-speed pistons D, D¹, D² and D³. Upon the opposite cylindrical ends of the hub 34ᵃ are rotatably mounted two two-armed frames, one consisting of the arms 40 and 41 and an integral flat ring 42 to which are secured the variable speed pistons E and E², and the other consisting of the arms 43 and 44 and the flat ring 45 to which are secured the pistons F and F¹. The rings 39, 42 and 45 are disposed between opposite flat faces of portions of the casing plates 31 and 52 adjacent and inside the peripheral portions 31ᵃ and 53 of such plates, and the outer edges of such rings are curved to conform to the shape of the pistons and make a gas-tight piston chamber. The arms 38 and 41 are connected by a toggle consisting of members 46 and 47, the knee of the toggle being connected by a pivoted link 48 with the eccentric pin 32, and the arms 37 and 44 are connected with such pin by a similar toggle 49—50 and link 51.

The position of the inlet port 52ᵃ and the exhaust port 52ᵇ, which are formed in the rear casing plate and are similar in the construction and arrangement of the walls of the ports and connected passages to those of the first described form of engine, is shown in full and dotted lines in Figs. 9, 12 and 13. In order to afford the most direct escape for the burned gases and prevent back pressure in any part of the exhaust opening, the exhaust port opens directly to atmosphere along its entire length. The spark plug, as shown, is arranged to ignite the explosive charges of gas at the point where the charges of gas in the working chambers between the pairs of coöperating pistons D and F, D³ and E², D² F¹ and D¹ and E are compressed to the greatest degree.

The spaces to the rear of the pistons F, F¹ F² and F³ are idle during the greater part of each revolution, but are utilized during the exhaust portion of the cycle to pump charges of air into the working spaces or chambers to scavenge them of burned gases. In order to permit the air to breathe back and forth freely except when the pumping action occurs, the ring 45 to which is secured the variable speed pistons F and F¹ is formed with two breathing passages, one marked 56, leading from the rear of the piston F¹ radially inward and terminating in a lateral arc-shaped port 56ᵃ and the other, marked 57, leading radially from the rear of the piston F and terminating in an arc-shaped port 57ᵃ; both of which ports are arranged to register with a series of recesses 58 cut in the face of the adjacent portion of the front casing plate 31 and opening inwardly inside the casing. The ports 56ᵃ and 57ᵃ are of such length as to bridge the uncut portions of the casing face (which are left merely as bearing surfaces) and the recesses 58 therefore provide in effect a continuous opening into the spaces between the pairs of pistons F¹ and D¹ and F and D, extending from a point some distance in advance of the end of the exhaust port (where the pumping action of the pistons is completed, as hereinafter explained) to a point where it overlaps the beginning of the exhaust port. From the latter point to the first mentioned point the face of the casing plate is continuous and the ports 56ᵃ and 57ᵃ are sealed.

The ring 42 is formed with diametrically opposite similar ports and passages arranged to coöperate with a similar series of recesses 59 in the rear casing plate 52, the passage and port to the rear of the piston E being marked 60 and 60ᵃ respectively, and the passage and port to the rear of the piston E² being marked 61 and 61ᵃ, respectively.

As shown in Figs. 9 and 10, the pistons D, D¹, D² and D³ are each formed with a recess 62 which is adapted to coöperate with a pair of bridging channels 63 and 63ᵃ formed in the piston chamber wall in the peripheral portion of the front casing plate 31, the purpose of which will be later explained. In Fig. 9 the outline of the channels 63 and 63ᵃ is indicated by dotted lines.

The mode of operation of the engine which has just been described is in most respects the same as that of the form first described, the explosive gas being taken in, compressed, burned and exhausted in the working chambers in the same manner. The manner in which the power of the burning gas is transmitted to the motor shaft may be regarded as the reverse of that exhibited in the first described engine, since the spreading of the pistons D and F creates a pull on the toggle members 49 and 50 which thrusts the link 51 against the eccentric pin 32, and as the pistons pass the dead center position shown in Figs. 9 and 11, moving in a counter position shown in Figs. 9 and 11, moving in a counter-clockwise direction, this thrust exerts a rotative effect until the toggle straightens to linear position, at which time the piston D uncovers the exhaust port. The piston E meanwhile has been accelerating and separating from the piston D, taking in air first through the passage 60 and port 60ᵃ and later also through the front end of the exhaust port, the pistons F, D and E then occupying the positions in which the pistons E, D' and F', respectively, are shown on Fig. 9. From this position the piston F accelerates and the piston E lags, with the result of causing such pistons to approach the piston D from opposite sides, expelling the burned gas from the space back of the piston D, and also expelling the air from the space in front of it until the front of the piston D passes the end of the exhaust port. The air is then trapped between the pistons D and E until the recess 62 in the side of the piston D bridges the channels 63 and 63ᵃ, and as the pistons continue closing together the air is expelled into the space between the pistons F and D, displacing an equal volume of burned gases. The solid uncut portion or bridge 64 of the piston chamber wall between the channels 63 and 63ᵃ prevents exhaust gases or air being drawn in between the pistons F and D in the further, separating movement of the pistons, which would otherwise take place around the piston F. The position of the pistons F, D and E just before the closing of the exhaust corresponds to the position of the pistons F', D² and E² shown in Fig. 11.

It is obvious that my invention is susceptible of various modifications and variations, other than above described, by changes in the construction and arrangement of the various parts or the substitution of equivalents and without changing its mode of operation or its essential elements. I therefore do not limit my claims to the specific embodiments of my invention herein shown and described.

I claim:

1. In an explosion engine, an annular piston chamber, a motor shaft, a piston in said piston chamber rigidly connected with said shaft, a piston in said piston chamber mounted to rotate coaxially of said motor shaft, a jointed connection between said pistons, an eccentric pin, and a link pivoted to said eccentric pin and pivotally connected to said jointed connection.

2. In an explosion engine, an annular piston chamber, a motor shaft, a piston in said piston chamber rigidly connected with said shaft, a piston in said piston chamber mounted to rotate coaxially of said motor shaft, a toggle having the outer ends of its members connected one to each piston, an eccentric pin, and a link pivoted to said eccentric pin and also pivoted to the knee of the toggle.

3. In an explosion engine, an annular piston chamber, a motor shaft, a pair of pistons arranged diametrically opposite in said piston chamber and rigidly connected with said shaft, a pair of rigidly connected pistons arranged diametrically opposite in said piston chamber and mounted to rotate coaxially of said motor shaft, a jointed connection between one of said first-mentioned pair of pistons and one of said second-mentioned pair of pistons, and a link pivoted to said eccentric pin and pivotally connected to said jointed connection.

4. In an explosion engine, an annular piston chamber, a motor shaft, a pair of pistons arranged diametrically opposite in said piston chamber and rigidly connected with said shaft, a pair of rigidly connected pistons arranged diametrically opposite in said piston chamber and mounted to rotate coaxially of said motor shaft, a toggle having the outer ends of its members connected one to one of said first-mentioned pair of pistons and the other to one of said second-mentioned pair of pistons, an eccentric pin, and a link pivoted to said eccentric pin and also pivoted to the knee of the toggle.

5. In an explosion engine, an annular piston chamber, a motor shaft, a piston in said piston chamber rigidly connected with said shaft, a piston in said piston chamber mounted to rotate coaxially of said motor shaft, a toggle having the outer ends of its members connected one to each piston, an eccentric pin, and a link pivoted to said eccentric pin and also pivoted to the knee of the toggle, said link being arranged to flex said toggle inwardly and outwardly from straight position at each revolution whereby said second-mentioned piston will be caused to approach and recede from said first-mentioned piston twice during such revolution.

6. In an explosion engine, an annular piston chamber, a motor shaft, four pistons in said piston chamber arranged ninety degrees apart and rigidly connected with said shaft, two pairs of diametrically opposite pistons in said chamber, the pistons of each pair being rigidly connected to each other and mounted to rotate coaxially of said motor shaft and the four pistons being arranged alternately with said first-mentioned four pistons, and means for oscillating said two pairs of rotatably mounted pistons to cause the pistons on opposite sides of any given one of said first-mentioned pistons to approach and recede from such particular piston during the same period of time.

7. In an explosion engine, an annular piston chamber, a motor shaft, four pistons in said piston chamber arranged ninety degrees apart and rigidly connected with said shaft, two pairs of diametrically opposite pistons in said chamber, the pistons of each pair being rigidly connected to each other and mounted to rotate coaxially of said motor shaft and the four pistons being arranged alternately with said first-mentioned four pistons, a toggle having the outer ends of its members connected one to said first-mentioned four connected pistons and the other to one of said pairs of connected pistons, and a second toggle having the outer ends of its members connected one to said first-mentioned four connected pistons and the other to the other one of said pairs of connected pistons, said toggles being similarly connected at an angle of ninety degrees from each other, an eccentric pin, a link pivoted to said eccentric pin and also pivoted to the knee of said first-mentioned toggle, and a second toggle also pivoted to said eccentric pin and pivoted also to the knee of said second-mentioned toggle.

8. In an explosion engine, an annular piston chamber, a motor shaft, four pistons in said piston chamber arranged ninety degrees apart and rigidly connected with said shaft, two pairs of diametrically opposite pistons in said chamber the pistons of each pair being rigidly connected to each other and mounted to rotate coaxially of said motor shaft and the four pistons being arranged alternately with said first-mentioned four pistons, a toggle having the outer ends of its members connected one to said first-mentioned four connected pistons and the other to one of said pairs of connected pistons, and a second toggle having the outer ends of its members connected one to said first-mentioned four connected pistons and the other to the other one of said pairs of connected pistons, said toggles being similarly connected at an angle of ninety degrees from each other, an eccentric pin, a link pivoted to said eccentric pin and also pivoted to the knee of said first-mentioned toggle, and a second toggle also pivoted to said eccentric pin and pivoted also to the knee of said second-mentioned toggle, said links being each arranged to flex its connected toggle inwardly and outwardly from straight position at each revolution.

9. An engine according to claim 6 provided with means for sealing every second space between the pistons, the alternate spaces being open to atmospheric pressure.

10. An engine according to claim 6 provided with means for sealing the spaces to the rear of the four pistons rigidly connected to the motor shaft, the spaces in front of such pistons being open to atmospheric pressure.

11. An engine according to claim 6 and provided with means for sealing every second space between the pistons, the alternate spaces being open to atmospheric pressure, and having also an inlet port and an exhaust port in its piston chamber walls arranged to coöperate with the pistons and respectively admit gas into the sealed spaces and exhaust the products of combustion therefrom.

12. An engine according to claim 6 and provided with means for sealing the spaces to the rear of the four pistons rigidly connected to the motor shaft, the spaces in front of such pistons being open to atmospheric pressure, and having also an inlet port and an exhaust port in its piston chamber walls arranged to coöperate with the pistons and respectively admit gas into the spaces to the rear of the four pistons rigidly connected to the motor shaft and exhaust the products of combustion therefrom.

13. An engine according to claim 6 in which the means for oscillating the rotatably mounted pistons include an eccentric pin, a train of linkage connected to said eccentric pin and the four connected pistons and also connected to one of the pairs of diametrically opposite connected pistons, and a second train of linkage also connected to the eccentric pin and the four connected pistons and connected also to the other one of the pairs of diametrically opposite connected pistons.

14. In an explosion engine, an annular piston chamber, a motor shaft, four pistons in said chamber arranged ninety degrees apart and rigidly connected with said shaft, four pistons in said chamber arranged alternately with said first-mentioned pistons and mounted to rotate coaxially of said motor shaft, means for oscillating said rotatably mounted pistons to cause the pistons on opposite sides of any given one of said first-mentioned pistons to approach and recede simultaneously from such particular piston, means for sealing every second space between the pistons, whereby it may function as a working chamber, the piston chamber walls being formed with intake and exhaust ports opened and closed by the piston to admit gas into such working chambers and exhaust the burned products of combustion therefrom, and means for sealing the alternate spaces during part of the exhaust period in an adjacent working chamber, the piston chamber walls being formed with a bridging passage arranged to place such alternate spaces when sealed successively in communication with such adjacent working chamber.

15. An explosion engine according to claim 14 in which the bridging passages include two separated channels and the pistons connected to the motor shaft are formed with recesses arranged to connect said channels.

16. An explosion engine according to claim 14 in which the chambers following the pistons secured to the motor shaft are arranged to function as working chambers and the bridging passage is arranged to place each working chamber in communication with the chamber in front of it during the concluding part of the exhaust period.

17. In an explosion engine of the character described and having an annular piston chamber wall formed continuous with opposed flat faces extending inwardly from the chamber, a frame secured to the motor shaft and formed with a peripheral flat ring equipped with pistons arranged to travel in said piston chamber, a pair of oscillating frames each formed with a peripheral flat ring equipped with pistons arranged to travel in said piston chamber and arranged within said flat faces of the piston chamber wall one on each side of said first-mentioned ring, the rings on said oscillating frames being formed with passages arranged to place each alternate space between the pistons in communication with the atmosphere.

18. In an explosion engine of the character described and having an annular piston chamber wall formed continuous with opposed flat faces extending inwardly from the chamber, a frame secured to the motor shaft formed with a peripheral flat ring equipped with pistons arranged to travel in said piston chamber, a pair of oscillating frames each formed with a peripheral flat ring equipped with pistons arranged to travel in said piston chamber and arranged within said flat faces of the piston chamber wall one on each side of said first-mentioned ring, the faces of the piston chamber walls being formed with recesses and the rings on said oscillating frames being formed with coöperating ports and passages arranged to place each alternate space between the pistons in communication with the atmosphere during part of a revolution of the pistons and seal it during the remainder of the revolution.

CARL O. FARNHAM.